United States Patent [19]

Fujita

[11] Patent Number: 4,468,982
[45] Date of Patent: Sep. 4, 1984

[54] VEHICLE DRIVING APPARATUS

[75] Inventor: Yasuhiko Fujita, Kyoto, Japan

[73] Assignee: Mitsubishi Jidosha Kogyo Kabushiki Kaisha, Tokyo, Japan

[21] Appl. No.: 311,017

[22] Filed: Oct. 13, 1981

[30] Foreign Application Priority Data

Oct. 15, 1980 [JP] Japan .................. 55-144111

[51] Int. Cl.³ .................. F16H 57/10; F16H 47/00
[52] U.S. Cl. .................. 74/762; 74/730
[58] Field of Search .................. 74/762, 763, 730

[56] References Cited

U.S. PATENT DOCUMENTS

| | | | |
|---|---|---|---|
| 3,339,431 | 9/1967 | Croswhite et al. | 74/763 |
| 3,482,469 | 12/1969 | Mori | 74/763 |
| 4,224,837 | 9/1980 | Croswhite | 74/763 |
| 4,346,622 | 8/1982 | Pierce | 74/762 |
| 4,368,649 | 1/1983 | Vahratian et al. | 74/730 |

*Primary Examiner*—Lawrence J. Staab
*Assistant Examiner*—Bruce F. Wojciechowski
*Attorney, Agent, or Firm*—Oldham, Oldham, Hudak, Weber & Sand Co.

[57] ABSTRACT

A vehicle driving apparatus applied to a small-sized vehicle of FF or RR type includes an input shaft connected to a drive shaft through a torque convertor, a planetary gearing including various gears and a carrier, an output gear, an intermediate transmission shaft provided at one end with a driven gear meshing with the output gear and connected at the other end to a final reduction device, and various clutches and brakes. In the apparatus, another clutch for providing an overdrive is disposed on the side opposite to the planetary gearing with respect to the output gear for disconnectably connecting the input shaft or the drive shaft to the carrier. The clutch protrudes from the transmission casing and is enclosed by a separate cover so that removal of the clutch can simply turn the four-forward speed automatic transmission into a three-forward speed automatic transmission.

2 Claims, 4 Drawing Figures

FIG. 2

| | CLUTCH 28 | CLUTCH 30 | BRAKE 42 | ONE-WAY CLUTCH 56 | BRAKE 58 | CLUTCH 62 | GEAR RATIO |
|---|---|---|---|---|---|---|---|
| 1ST SPEED | ○ | — | — | ○ | (○) | — | 2.551 |
| 2ND SPEED | ○ | — | ○ | — | — | — | 1.488 |
| 3RD SPEED | ○ | ○ | — | — | — | — | 1.000 |
| 4TH SPEED | — | — | ○ | — | — | ○ | 0.685 |
| REVERSE | — | ○ | — | — | ○ | — | 2.176 |

VEHICLE DRIVING APPARATUS

BACKGROUND OF THE INVENTION

This invention relates to a vehicle driving apparatus, and more particularly to an improved vehicle driving apparatus suitable for use in an automotive vehicle of front-engine front-drive type (which will be referred to hereinafter as an FF-type vehicle) or an automotive vehicle of rear-engine rear-drive type (which will be referred to hereinafter as an RR-type vehicle) to provide speed stages of four-forward and one-reverse speeds including an overdrive.

Automatic transmissions are commonly known in which a planetary gearing of Ravigneaux type is employed to provide speed stages of four-forward and one-reverse speeds including an overdrive. In the known automatic transmissions, a clutch unit connecting between an input shaft and a carrier is disposed within a torque convertor or a transmission casing so as to provide the overdrive speed stage. However, these known automatic transmissions have been defective in that the total length thereof becomes inevitably larger than that of automatic transmissions in which the planetary gearing of Ravigneaux type is similarly employed to provide speed stages of three-forward and one-reverse speeds, resulting in difficulty of attaining standardization of parts, especially, transmission casings of the latter and former automatic transmissions. Although the four-forward speed automatic transmission of the construction above described can be turned into a three-forward speed automatic transmission when the clutch unit providing the overdrive speed stage is removed, the total length thereof cannot be shortened because the transmission casing itself remains in the length designed primarily for the four-forward speed automatic transmission. It has therefore been difficult, not only from the aspect of cost but also from the aspect of space, to mount such a three-forward speed automatic transmission on an FF-type vehicle or an RR-type vehicle of small size which does not substantially require a four-forward speed transmission and is therefore inexpensive and in which the engine is frequently situated transversely.

SUMMARY OF THE INVENTION

It is a primary object of the present invention to provide an improved vehicle driving apparatus which can function as both of a four-forward speed automatic transmission and a three-forward speed automatic transmission, as desired.

In accordance with the present invention, there is provided a vehicle driving apparatus comprising an input shaft connected to a drive shaft of an engine through a turbo type hydraulic transmission, a planetary gearing of Ravigneaux type composed of a front sun gear, a rear sun gear, a short pinion gear arranged for meshing engagement with the rear sun gear, a long pinion gear arranged for meshing engagement with the front sun gear and the short pinion gear, a carrier arranged to rotatably support the short and long pinion gears and to be rotatable around its own axis, and a ring gear arranged for meshing engagement with the long pinion gear and connected to an output gear, an intermediate transmission shaft disposed in a relation substantially parallel to the central axis of rotation of the planetary gearing, the intermediate transmission shaft being provided at one end thereof with a driven gear making meshing engagement with the output gear and being connected at the other end thereof to a final reduction device, a first clutch disconnectably connecting the input shaft to the rear sun gear, a second clutch disconnectably connecting the input shaft to the front sun gear, a first brake for braking the rotation of the front sun gear, a second brake for braking the rotation of the carrier, and a third clutch disposed on the side opposite to the planetary gearing with respect to the output gear for disconnectably connecting the input shaft or the drive shaft to the carrier, the clutches and the brakes being selectively actuated for providing speed stages of four-forward and one-reverse speeds.

According to the structure above described, the third clutch disconnectably connecting the input shaft or the drive shaft to the carrier for providing the overdrive is disposed at the outermost end of the transmission, or substantially at the exterior of the transmission casing. Therefore, if a cover for enclosing the third clutch is formed separately from the transmission casing, the transmission casing can be used in common to a four-forward speed automatic transmission and a three-forward speed automatic transmission. When the third clutch is removed so that the transmission functions now as a three-forward speed automatic transmission, the total length of the automatic transmission can be made shorter by the length of the third clutch than that of the four-forward speed automatic transmission.

BRIEF DESCRIPTION OF THE DRAWINGS

The present invention will now be described in detail by way of example with reference to the accompanying drawings, in which:

FIG. 2 is a table showing the relation between the operating conditions of the frictional elements and the speed stages;

DESCRIPTION OF THE PREFERRED EMBODIMENTS

Figure 1:
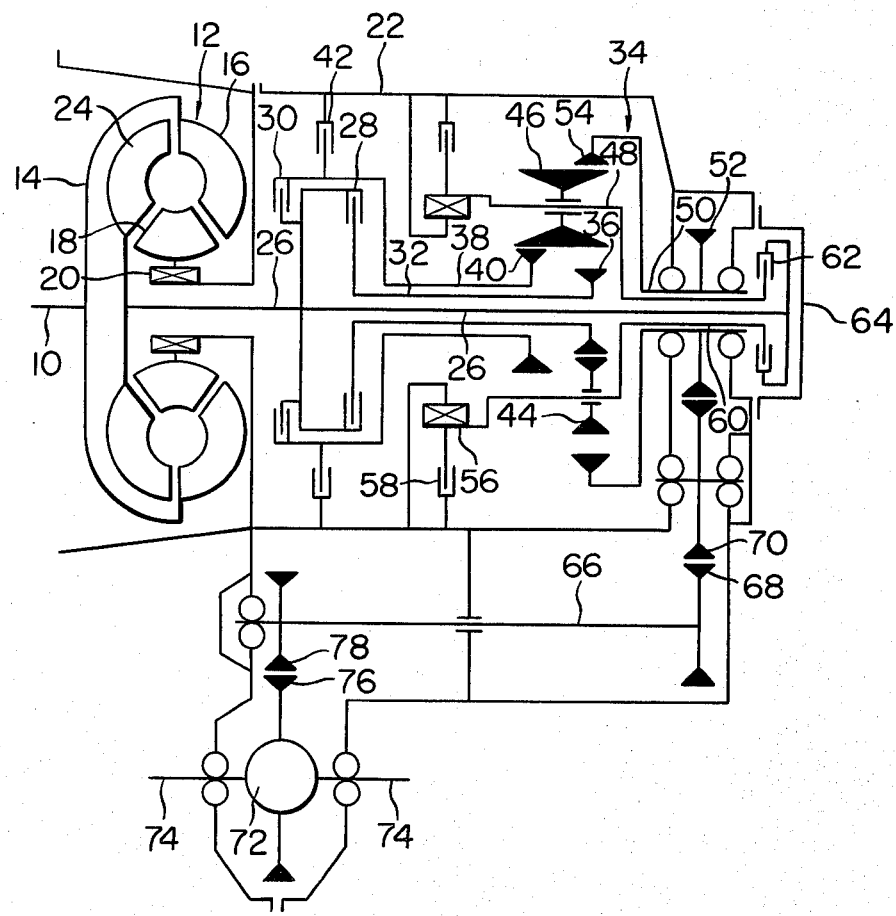
FIG. 1 is a diagrammatic view showing the general structure of a preferred embodiment of the vehicle driving apparatus according to the present invention.

FIGS. 1 and 2 show a preferred embodiment of the vehicle driving apparatus according to the present invention. Referring first to FIG. 1, a drive shaft 10 coupled directly to a crankshaft of a vehicle's engine (not shown) is connected through an input casing 14 of a torque convertor 12 to a pump 16 of the torque convertor, and a stator 18 of the torque convertor is connected through a one-way clutch 20 to a transmission casing 22. A turbine 24 of the torque convertor 12 is connected through an input shaft 26 to clutches 28 and 30. The first clutch 28 is connected at its output side to a rear sun gear 36 of a planetary gearing 34 of Ravigneaux type (which will be referred to hereinafter merely as a gearing) through a hollow tubular first intermediate shaft 32. The second clutch 30 is connected at its output side to a front sun gear 40 of the gearing 34 through a hollow tubular second intermediate shaft 38 fitted on the first intermediate shaft 32 and also to a first brake 42 provided for braking the rotation of the front sun gear 40. The gearing 34 includes, in addition to the rear sun gear 36 and the front sun gear 40 above described, a short pinion gear 44 arranged for meshing engagement with the rear sun gear 36, a long pinion gear 46 arranged for meshing engagement with the front sun gear 40 and short pinion gear 44, a carrier 48 arranged to rotatably support the two pinion gears 44, 46 and to be rotatable around its own axis, and a ring gear 54 arranged for meshing engagement with the long pinion gear 46 and connected to an output gear 52 through a hollow tubular output shaft 50. The carrier 48 is connected at one end thereof to the transmission casing 22 through a one-way clutch 56 and also to a second brake 58 provided for braking the rotation of the carrier. The carrier 48 is connected at the other end thereof to the output side of a third clutch 62 through a hollow tubular third intermediate shaft 60 fitted in the output shaft 50. The third clutch 62 is disposed at a position which is spaced from the output gear 52 in the right-hand direction and which is external relative to the transmission casing 22. The clutch 62 is connected at its input side to an extension of the input shaft 26 extending through the first and third intermediate shafts 32 and 60 to terminate at a point external relative to the transmission casing 22. As seen in FIG. 1, the clutch 62 is enclosed by a cover 64 formed separately from the transmission casing 22 and detachably mounted on the casing.

The output gear 52 makes meshing engagement with an idle gear 70 which is in turn in meshing engagement with a driven gear 68 mounted on the right-hand end of an intermediate transmission shaft 66 disposed in parallel with the input shaft 26. The intermediate transmission shaft 66 is connected at its left-hand end to a gear 78 which makes meshing engagement with a final reduction gear 76 connected to drive axles 74 through a differential gear unit 72.

It will be apparent from FIG. 1 that the transmission casing 22 is so configured as to enclose the members ranging from the torque convertor 12 to the output gear 52 and also the members including the intermediate transmission shaft 66 and differential gear unit 72, and the clutch 62 is disposed to protrude to the exterior of the transmission casing 22. The one-way clutch 56 is so constructed that, while it permits transmission of drive force from the input shaft 26 to the drive axles 74 for forward drive, it inhibits transmission of the drive force when drive force is transmitted from the drive axles 74 to the input shaft 26 (that is, when the vehicle is being decelerated) and, also, when the direction of reaction force is reversed (that is, when the vehicle is being driven in the reverse direction).

Each of the clutches and brakes above described is provided with an engaging mechanism such as a piston-cylinder assembly or a servo mechanism so that it can be engaged or disengaged by supplying or discharging hydraulic fluid under pressure. The hydraulic fluid is selectively supplied to the clutches and brakes from a hydraulic fluid source (not shown), and the selected combinations of the actuated clutches and brakes provide speed stages of four-forward and one-reverse speeds. The table shown in FIG. 2 illustrates the relation between the operating conditions of the clutches and brakes and the speed stages. The symbol "—" indicates that the corresponding clutch or brake is engaged and that the one-way clutch 56 is locked, while the symbol "—" indicates that the corresponding element is disengaged or unlocked. The gear ratios at the individual speed stages shown in FIG. 2 are based on the numbers of teeth of the rear sun gear 36, front sun gear 40, short pinion gear 44, long pinion gear 46 and ring gear 54 of the gearing which are selected to be 29, 34, 19, 20 and 74 respectively.

In operation, the clutch 28 is engaged to transmit drive force from the drive shaft 10 to the rear sun gear 36 through the torque convertor 12, input shaft 26, clutch 28 and first intermediate shaft 32. The ring gear 54, which is connected to the drive axles 74 through the members including the output gear 52, intermediate transmission shaft 66 and final reduction gear 76 and upon which the load of the vehicle acts, tends to rotate the carrier 48 in a direction opposite to the direction of rotation of the rear sun gear 36 (a direction opposite to the direction of rotation of the drive shaft 10). However, the one-way clutch 56 is maintained in its locked position to lock the carrier 48 against rotation in the opposite direction, and the carrier acts as a reaction element thereby providing the 1st speed as will be apparent from the table shown in FIG. 2. In the 1st speed position of the automatic transmission, the drive force is transmitted from the rear sun gear 36 to the ring gear 54 and then to the output gear 52 through the pinion gears 44 and 46. In the 1st speed position of the automatic transmission, engagement of the brake 58 locks the carrier 48 against rotation in both the directions, thereby providing the engine braking action in which drive force is transmitted from the drive axles 74 to the drive shaft 10.

Then, when the brake 42 is engaged while maintaining the clutch 28 in the engaged position (and after releasing the brake 58 when the brake has been engaged to apply the engine braking in the 1st speed position), the front sun gear 40 is locked against rotation and acts now as a reaction element to attain the 2nd speed. In the 2nd speed position of the automatic transmission, the carrier 48 rotates in the same direction as that of the engine, and the drive force is transmitted from the rear sun gear 36 to the ring gear 54.

Then, when the brake 42 is released and the clutch 30 is engaged in turn, the two sun gears 36 and 40 rotate conjointly, so that the entire gearing 34 rotates as a unit to attain the 3rd speed at which the rotation speed of the output gear 52 is equal to that of the input shaft 26. Then, when the brake 42 and clutch 62 are engaged after releasing the clutches 28 and 30, the front sun gear 40 acts now as a reaction element, and the drive force is now transmitted from the carrier 48 to attain the overdrive or 4th speed at which the rotation speed of the ring gear 54 is higher than that of the carrier 48.

According to the structure of the vehicle driving apparatus of the present invention, the clutch 62 provided for attaining the 4th speed is disposed on the side opposite to the gearing 34 with respect to the output gear 52 and at the exterior of the transmission casing 22 and is enclosed by the separate cover 64. The present invention is therefore advantageous in that a casing of a three-forward speed automatic transmission, which does not require the clutch 62, can be directly utilized as the transmission casing 22. This means that transmission casings of standardized dimensions can be used in common to both of three-forward speed automatic transmissions and four-forward speed automatic transmissions thereby exhibiting the greatest merit of standardization which improves the productivity of such transmissions, and the latter and former transmission casings have the same length.

Figure 3:
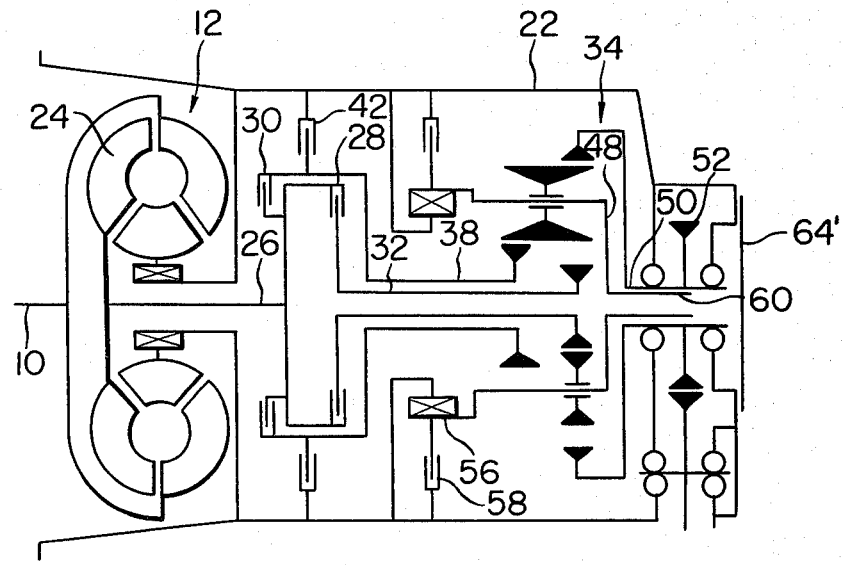
FIG. 3 is a diagrammatic view showing how the four-forward speed automatic transmission shown in FIG. 1 is turned into a three-forward speed automatic transmission.

The vehicle driving apparatus having the structure shown in FIG. 1 can be readily turned into an automatic transmission having three-forward and one-reverse speeds, as described with reference to FIG. 3. As seen in FIG. 3, the third clutch 62 and the extension of the input shaft 26 extending through the first and third intermediate shafts 32 and 60 are removed, and a cover 64′ in the form of a plate is mounted to cover the portion of the transmission casing 22 exposed by the removal of the clutch 62. It will be seen that the total length of the vehicle driving apparatus can be shortened by the amount corresponding to the protruding length of the clutch 62 from the transmission casing 22. Thus, the total length of the vehicle driving apparatus is approximately the same as when the apparatus is designed and manufactured to exclusively function as a three-forward speed transmission, and the apparatus can be readily mounted on FF-type and RR-type vehicles which are inexpensive and in which the engine is situated transversely.

In the vehicle driving apparatus shown in FIG. 1, the extension of the input shaft 26 connected to the clutch 62 may be splined to the portion of the input shaft 26 extending from the turbine 24 to the clutches 28 and 30, and the output side of the clutch 62 may be splined to the third intermediate shaft 60 connected to the carrier 48, so that the clutch 62 can be easily mounted and removed, and assembling of these parts in the manufacturing process can be facilitated.

According to the structure of the vehicle driving apparatus of the present invention, the rotation speed of the third intermediate shaft 60 connected to the output side of the clutch 62 is equal to that of the input shaft 26 connected to the input side of the clutch 62 when the 3rd speed is attained. Therefore, means such as a synchronizer for alleviating a shock that may appear during the engagement of the clutch 62 is utterly unnecessary, and clutch such as a dog clutch which is inexpensive and simple in structure, instead of a clutch such as a wet type multiple-disc clutch which is inexpensive and complex in structure, can be fully satisfactorily utilized as the clutch 62. The dog clutch has the length substantially shorter than that of the multiple-disc clutch. Thus, in this case, the four-forward speed automatic transmission is relatively inexpensive and has a shortened total length.

Further, according to the structure of the vehicle driving apparatus of the present invention, it is merely necessary for a shift from the 3rd to the 4th speed to disengage the clutches 28, 30 and to engage the brake 42 after completely engaging the clutch 62. Therefore, it is unnecessary to control the timing of hydraulic fluid supply to the clutch 62 for alleviating a shock that may appear during the shift, and the structure of the hydraulic fluid control circuit can also be simplified.

Figure 4:
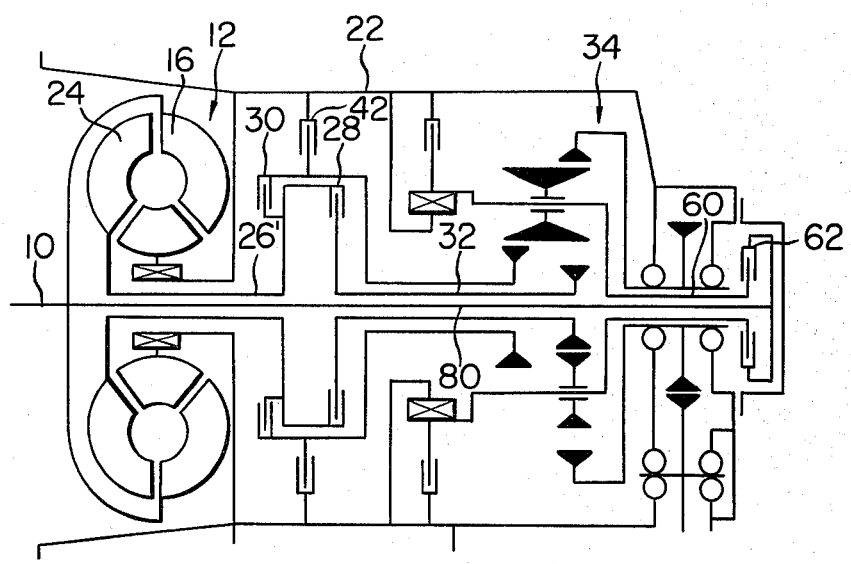
FIG. 4 is a diagrammatic view showing the general structure of a modification of the embodiment shown in FIG. 1.

In the embodiment described with reference to FIG. 1, the drive force from the drive shaft 10 is transmitted necessarily through the torque convertor 12. A modification of the present invention is shown in FIG. 4. Referring to FIG. 4, a hollow tubular input shaft 26′ connects the turbine 24 to the clutches 28 and 30, and the clutch 62 is directly coupled to the drive shaft 10 by a second input shaft 80 extending through the first input shaft 26′, first intermediate shaft 32 and third intermediate shaft 60. The modification shown in FIG. 4 exhibits operational effects generally similar to those exhibited by the embodiment shown in FIG. 1. In addition, because of the fact that, when the 4th speed is attained, the drive force from the drive shaft 10 is mechanically transmitted only through the second input shaft 80 without being transmitted through the torque convertor 12, losses of power due to, for example, a slip in the torque convertor 12 can be prevented to improve the fuel consumption, accelerating response and other operating factors. Further, when the clutch 62 is engaged at the 3rd speed in lieu of any one of the clutches 28 and 30, part of the drive force is mechanically transmitted through the clutch 62 so that the fuel consumption, accelerating response and other operating factors at the 3rd speed can also be improved.

It is apparent that, in the modification shown in FIG. 4 too, removal of the second input shaft 80 and clutch 62 provides simply a three-forward speed automatic transmission.

What is claimed is:

1. A vehicle driving apparatus comprising an input shaft connected to a drive shaft of an engine through a turbo type hydraulic transmission, a planetary gearing of Ravigneaux type composed of a front sun gear, a rear sun gear, a short pinion gear arranged for meshing engagement with said rear sun gear, a long pinion gear arranged for meshing engagement with said front sun gear and said short pinion gear, a carrier arranged to rotatably support said short and long pinion gears and to be rotatable around its own axis, and a ring gear arranged for meshing engagement with said long pinion gear and connected to an output gear, an intermediate transmission shaft disposed in a relation substantially parallel to the central axis of rotation of said planetary gearing, said intermediate transmission shaft being provided at one end thereof with a driven gear making meshing engagement with said outer gear and being connected at the other end thereof to a final reduction device, a first clutch controllably connecting said input shaft to said rear sun gear, a second clutch controllably connecting said input shaft to said front sun gear, a first brake for braking the rotation of said front sun gear, a second brake for braking the rotation of said carrier, and a third clutch disposed on the side opposite to said planetary gearing with respect to said output gear for controllably connecting said input shaft to said carrier, said planetary gearing, said first and second clutches, said first and second brakes and said output gear being provided between said turbo type hydraulic transmission and said third clutch, said clutches and said brakes being selectively actuated for providing speed stages of four-forward and one-reverse speeds, and
  wherein said third clutch is mounted so as to be detachable from said input shaft and said carrier by being positioned at an end of the transmission.

2. A vehicle driving apparatus comprising an input shaft connected to a drive shaft of an engine through a turbo type hydraulic transmission, a planetary gearing of Ravigneaux type composed of a front sun gear, a rear sun gear, a short pinion gear arranged for meshing engagement with said front sun gear and said short pinion gear, a carrier arranged to rotatably support said short and long pinion gears and to be rotatable around its own axis, and a ring gear arranged for meshing engagement with said long pinion gear and connected to an output gear, an intermediate transmission shaft disposed in a relation substantially parallel to the central axis of rotation of said planetary gearing, said intermediate transmission shaft being provided at one end thereof with a driven gear making meshing engagement with said output gear and being connected at the other end thereof to a final reduction device, a first clutch operably connecting said input shaft to said rear sun gear, a second clutch operably connecting said input shaft to said front sun gear, a first brake for braking the rotation of said front sun gear, a second brake for braking the rotation of said carrier, and a third clutch disposed on the side opposite to said planetary gearing with respect to said output gear for operably connecting said drive shaft to said carrier, said planetary gearing, said first and second clutches, said first and second brakes and said output gear being provided between said turbo type hydraulic transmission and said third clutch, said clutches and said brakes being selectively actuated for providing speed stages of four-forward and one-reverse speeds, and wherein said third clutch is mounted so as to be detachable from said drive shaft and said carrier.

* * * * *